United States Patent [19]

Fox et al.

[11] 4,013,866
[45] Mar. 22, 1977

[54] PLASMA TORCHES

[75] Inventors: Thomas Joseph Fox, Loughborough; John Ernest Harry, Edmondthorpe, both of England

[73] Assignee: National Research Development Corporation, London, England

[22] Filed: Mar. 4, 1976

[21] Appl. No.: 663,992

[30] Foreign Application Priority Data

Mar. 5, 1975 United Kingdom ............ 09148/75

[52] U.S. Cl. ............................ 219/121 P; 219/123
[51] Int. Cl.² ............................................. B23K 9/08
[58] Field of Search ................ 219/121 P, 122, 123

[56] References Cited

UNITED STATES PATENTS

| 2,809,278 | 10/1957 | Persson | 219/123 |
| 3,106,634 | 10/1963 | Eschenbach et al. | 219/123 X |
| 3,275,786 | 9/1966 | Cushman | 219/123 X |

FOREIGN PATENTS OR APPLICATIONS

| 6,958 | 3/1962 | Japan | 219/121 P |

*Primary Examiner*—Bruce A. Reynolds
*Assistant Examiner*—M. Paschall
*Attorney, Agent, or Firm*—Cushman, Darby & Cushman

[57] ABSTRACT

A heating device which produces a plasma flame of elongated cross-section comprises a plasma torch and means for generating a magnetic field. The nozzle of the torch has an elongated exit aperture, across which the magnetic field is directed, and the torch incorporates at least one internal electrode arranged so that when an arc is struck between it and the nozzle the arc root at the nozzle will move along the aperture under the influence of the magnetic field.

10 Claims, 5 Drawing Figures

PLASMA TORCHES

This invention relates to plasma torches. Typically a plasma torch comprises a hollow structure through which a stream of gas may be passed so as to emerge through a conductive nozzle, and at least one electrode having an active portion disposed within the hollow structure so that an electric arc can be struck between it and the nozzle; usually a plasma torch is operated using a d.c. power supply connected so that the nozzle is positive with respect to the internal electrode(s), and means are normally provided for the forced cooling of the nozzle and the internal electrode(s). In one mode of operation (the non-transferred mode) the gas passed through the torch is heated by the arc and emerges from the nozzle as a jet of high velocity and high temperature; in an alternative mode of operation (the transferred mode) a pilot arc is initially struck within the torch and is subsequently caused to transfer from the nozzle to a conductive workpiece disposed close to the nozzle, the workpiece being connected to the power supply through a path of lower resistance than that associated with the nozzle. The non-transferred mode is commonly used for spraying surfaces with refractory materials, while the transferred mode is commonly used for cutting and welding conductive materials.

Conventional plasma torches use nozzles having exit apertures of circular form with a diameter of not more than a few millimeters; this of course imposes a restriction on the speed with which a given surface area of a workpiece can be treated when using a single plasma torch, and various proposals have therefore been made for designs of plasma torch which will produce a plasma flame of elongated cross-section. None of these proposals, however, is completely satisfactory in respect of factors such as efficiency of heat transfer to a workpiece, stability of operation, and capacity for operation in both the transferred and non-transferred modes.

According to the present invention there is provided a plasma torch whose nozzle has an elongated exit aperture, in combination with means for generating a magnetic field directed across the width of the aperture and extending along the aperture over a distance much greater than the width of the aperture, the torch having at least one internal electrode whose active portion is arranged so that when an arc is struck between it and the nozzle deflection of the arc by the magnetic field will cause the arc root at the nozzle to move along the aperture without substantial movement of the other arc root.

The invention will be further described and explained with reference to certain exemplary embodiments which are illustrated in the accompanying drawings. In these drawings.

Figure 1:
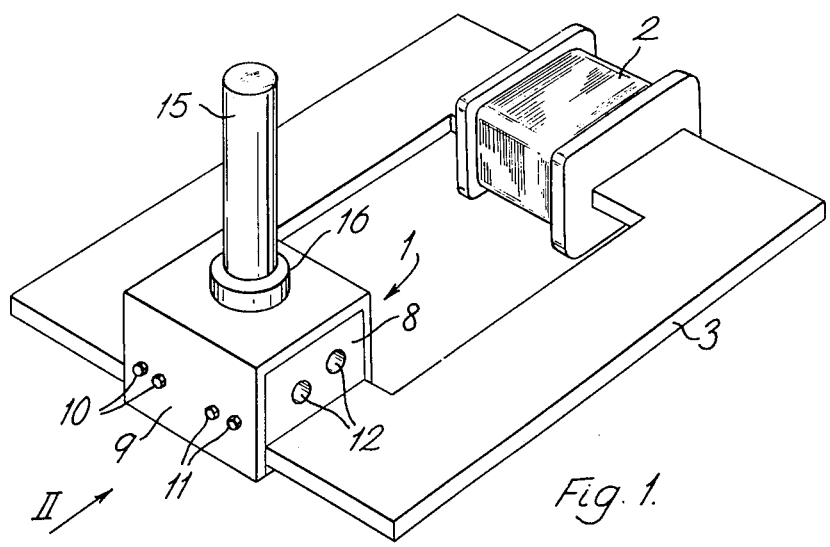
FIG. 1 is a perspective view of a first form of heating device in accordance with the invention.
Figure 2:
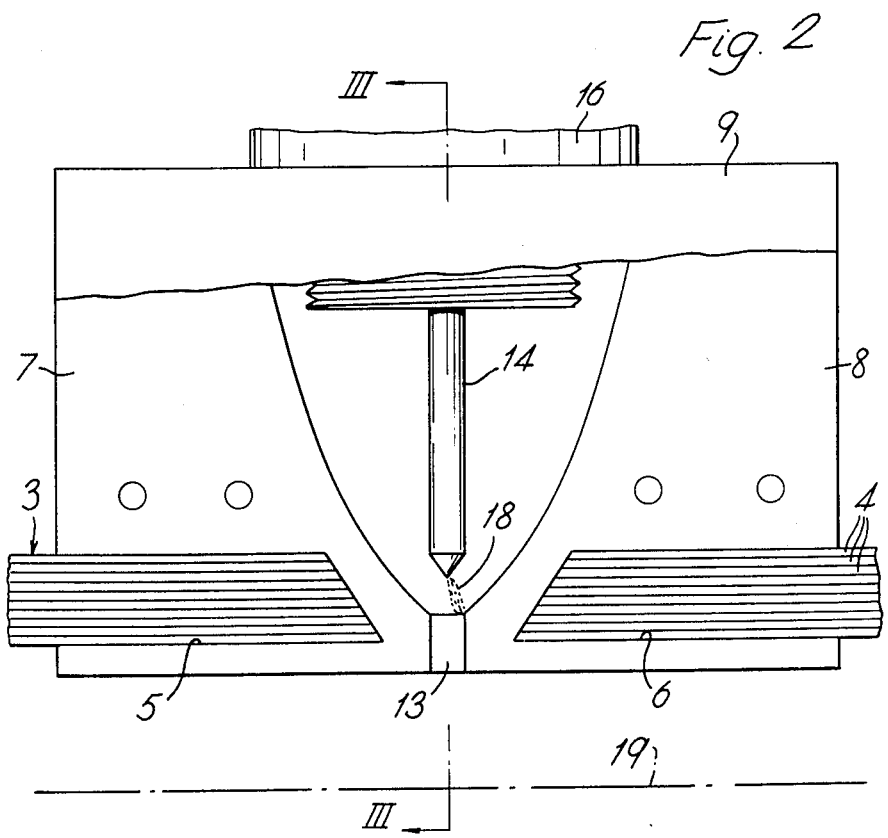
FIG. 2 is a partial and elevation (partly cut away to show internal details) of the device shown in FIG. 1 viewed in the direction of the arrow II in FIG. 1.
Figure 3:
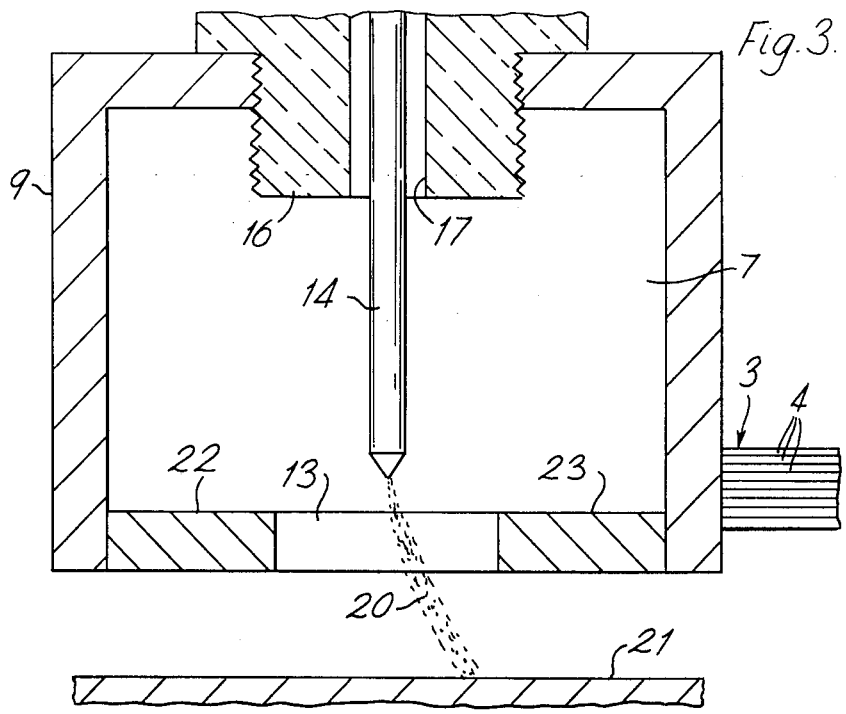
FIG. 3 is a sectional view of part of the device shown in FIG. 1, the section being on the line III — III in FIG. 2.

The device illustrated in FIGS. 1 to 3 comprises a plasma torch (generally designated 1), in combination with an electromagnet having a coil 2 wound on one limb of a rectangular core 3 of ferromagnetic material, the core 3 consisting of laminations 4 (see FIGS. 2 and 3) stacked to a depth of 8 millimeters; as will be seen from FIG. 2, the limb of the core 3 opposite that carrying the coil 2 has formed in it a centrally disposed air gap which is uniform in a horizontal direction but whose width tapers in a vertical direction so that the magnetic flux density in the gap will be at a maximum at the bottom of the gap. The ends of the laminations 4 on either side of the air gap fit into slots 5 and 6 respectively formed in two identical copper blocks 7 and 8 which together effectively constitute the nozzle of the torch 1, the blocks 7 and 8 being held within a brass jacket 9 by means of bolts 10 and 11 and having formed in them cavities (not seen in the drawings) through which cooling water may be circulated via ports 12; the blocks 7 and 8 may suitably have a length (in the direction of the arrow II in FIG. 1) of about five centimeters. The nozzle has an elongated aperture 13 disposed between the lower ends of the blocks 7 and 8, the aperture 13 being in the form of a rectangular slot the centre of whose depth is aligned with the narrowest part of the air gap in the core 3. While in some cases the aperture 13 may extend along the whole length of the blocks 7 and 8, as explained below it may be preferred to restrict the aperture 13 to a central portion (somewhat less than a half) of the length of the blocks 7 and 8; in either event the aperture 13 may suitably have a width in the range ½ to 4 millimeters and a depth of about 5 millimeters.

The torch 1 further includes an internal electrode 14 in the form of a tungsten rod of diameter 3 millimeters, the rod being arranged with its axis extending vertically and centrally disposed with respect to both the length and width of the aperture 13. The electrode 14 is tapered to a point at its lower end, this point being disposed up to a few millimeters above the top of the aperture 13. The electrode 14 is mounted in a head 15 which is secured to the jacket 9 by means of a threaded ceramic coupling member 16 screwing into a hole in the jacket 9; the details of the head 15 are not shown in the drawings since they are entirely conventional, the head 15 including a clamp for holding the upper end of the electrode 14, means for cooling this clamp by the circulation of water, and an inlet through which a stream of gas may be introduced so as to pass through a central aperture 17 in the member 16 into the interior of the hollow structure constituted by the blocks 7 and 8 and the jacket 9. The internal faces of the blocks 7 and 8 are gently tapered (as seen in FIG. 2) so as to encourage a smooth flow of the gas towards the exit aperture 13.

The torch 1 is operated in conventional manner from a d.c. power supply (suitable having a nominal open circuit voltage of 480 volts) with the electrode 14 connected as a cathode and the nozzle connected as an anode. A stream of a suitable gas (which for many applications may be argon) is passed through the torch 1, suitable flow rates for argon being in the range 30 to 90 liters per minute when the electrodes are dimensioned as indicated above. As illustrated in FIG. 2, for non-transferred operation an arc (indicated diagrammatically at 18) is struck between the electode 14 and the nozzle, and the surface of a workpiece (indicated by the line 19) is disposed so that the plasma jet issuing from the aperture 13 will impinge on it; as illustrated in FIG. 3, for transferred operation an arc (indicated diagrammatically at 20) is caused to strike between the electrode 14 and a conductive workpiece 21 after the striking of a pilot arc between the electrode 14 and the nozzle. In both cases the workpiece surface may suitably be disposed between 5 and 20 millimeters from the nozzle. It should be noted that for operation in the transferred mode, in order to achieve reliable transfer of the arc without the need for a very close working distance between the nozzle and the workpiece, it may be desirable to restrict the length of the aperture 13 to a value not much in excess of 2 centimeters. As illustrated in FIG. 3, this may readily be provided for by the insertion of copper members 22 and 23 between the blocks 7 and 8.

A sinusoidal alternating current, typically having a frequency in the range 50 to 1,000 Hz, is fed to the coil 2 so as to generate an alternating magnetic field directed across the width of the aperture 13 and extending along the whole length of the aperture 13; in order to ensure reliable initiation of the operation of the device, it is desirable for the arc between the electrode 14 and the nozzle to be struck before the current to the coil 2 is switched on. For both the transferred and non-transferred modes of operation, the magnetic field interacts with the arc so as to exert on the arc a force directed parallel to the length of the aperture 13, the sense and magnitude of this force being dependent at any instant on the sense and magnitude of the magnetic flux density; the magnitude of the force is of course also dependent on the arc current. As a result, the anode root of the arc oscillates to and fro at the frequency of the field in a direction parallel to the length of the aperture 13, the cathode root remaining substantially stationary. The heating effect produced by the device is thus distributed over a distance along the length of the aperture 13 dependent on the amplitude of the oscillation of the anode root of the arc. A practical limitation on this distance is imposed by the behaviour of the arc at the extremities of the oscillation; using an arc current of 150 amps., an oscillation frequency of 50 Hz and a peak magnetic flux density of 0.06 Webers per square meter, it has been found possible in practice to produce heated zones of length about 1.5 centimeters in the case of non-transferred operation and about 9 centimeters in the case of transferred operation.

For most applications of the device it is of course necessary that the heated zone should be caused to traverse the surface of a workpiece by bringing about relative movement between the device and the workpiece. This movement may be either parallel or perpendicular to the length of the aperture 13, depending on the type of application involved. In the latter case rates of traverse of the order of 1 to 10 millimeters per second are likely to be suitable when operating with oscillation frequencies at the lower end of the range quoted above. If required, higher rates of traverse should be feasible when operating with oscillation frequencies at the higher end of that range. A further consideration relevant to the choice of oscillation frequency when operating in the transferred mode is that for some applications (and in particular for some workpiece materials) there may be a risk of localised overheating of the workpiece due to "sticking" of the arc root on the workpiece; this risk can normally be avoided by working with a frequency at the upper end of the specified range so as to obtain a relatively rapid movement of the arc root over the surface of the workpiece. It will of course be appreciated that when operating at a low frequency it will normally be convenient to derive the energising current for the electromagnet from a mains supply, thereby avoiding the expense of providing an independent a.c. power supply circuit.

Provided that any necessary precaution has been taken to eliminate the risk of sticking of the arc root on the workpiece, the heating effect produced by the device is relatively uniform along the length of the heated zone. This may be exemplified by the results of a test made when operating in the transferred mode at an oscillation frequency of 50 Hz with a peak-to-peak deflection of the anode root of three centimeters while moving the device relative to a mild steel workpiece at a velocity of 1.2 millimeters per second in a direction perpendicular to the length of the aperture 13; in this case a peak temperature of 790° C was measured at a point in the workpiece over which the centre of the aperture 13 passed, while a peak temperature of 755° C was measured at a corresponding point offset by 1 centimeter from the path of the centre of the aperture 13, both these points being 2 millimeters below the surface of the workpiece. It is envisaged that, if desired, an even more uniform heating effect could be achieved by arranging for the waveform of the oscillation of the anode root of the arc to be appropriately modified. This could be effected either by using a non-sinusoidal waveform for the magnetic field, or by varying the width of the air gap in the core 3, and hence the magnetic flux density, along the length of the aperture 13.

It will be appreciated that the device described above could readily be modified to enable longer heated zones to be produced, by increasing the length of the exit aperture in the nozzle and providing a plurality of similar internal electrodes spaced apart along the length of the aperture; the individual arcs struck from these electrodes would of course oscillate in synchronism in the magnetic field, so that a uniform heating effect over a substantial distance would be achieved by spacing the electrodes apart by a distance substantially equal to the peak-to-peak deflection of each individual anode root. For some applications, a further modification which is contemplated is a change of shape of the exit aperture in the nozzle so that its longitudinal axis is of non-rectilinear (for example arcuate) form; this modification would of course also require an appropriate change in the shape of the poles of the electromagnet. The two types of modification just discussed could possibly be combined in a single device to enable the production of a plasma jet of annular form, which could find application in operations such as trepanning.

Figure 4:
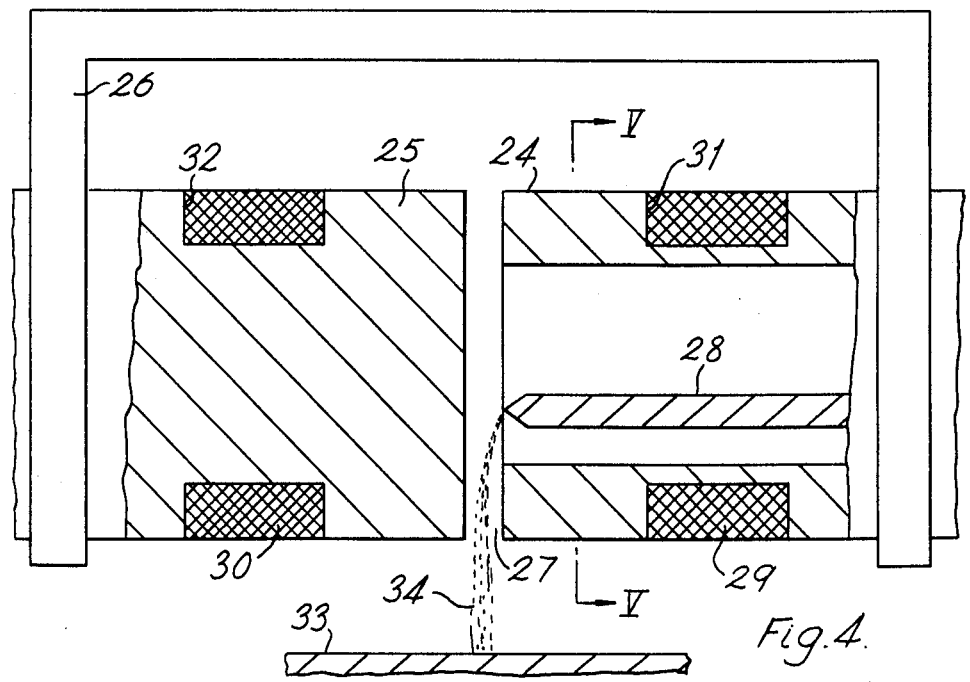
FIG. 4 is a somewhat diagrammatic side view (partly in section on the line IV — IV in FIG. 5) of part of a second form of heating device in accordance with the invention.
Figure 5:
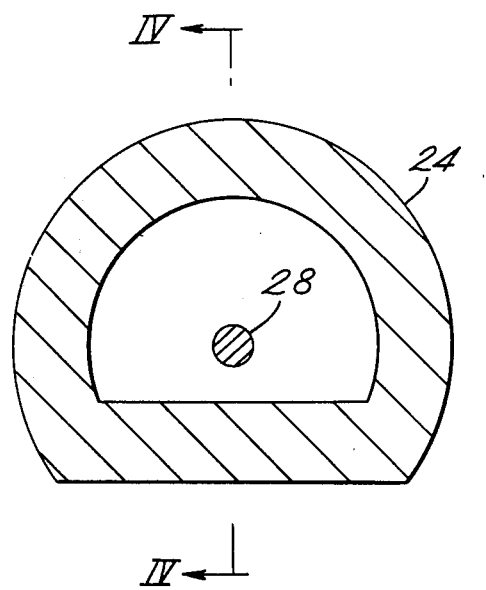
FIG. 5 is a section on the line V — V in FIG. 4.

In contrast to the device described above, which is based on the use of an alternating magnetic field to oscillate an arc root over a definite distance, the device illustrated in FIGS. 4 and 5 is based on the use of a static magnetic field to cause a continuous movement of an arc root in one sense along an endless path. The device in this case comprises a plasma torch having a nozzle constituted by a copper tube 24 and a copper rod 25, the tube 24 having (as seen in FIG. 5) an external cross-section partly in the form of a major arc of a circle and partly in the form of a chord of the circle and the rod 25 having a cross-section identical with the external cross-section of the tube 24. The tube 24 and the rod 25 are held in accurate alignment by a bracket 26, with their ends closely spaced so as to define between them an exit aperture 27. The torch further comprises an internal electrode 28 identical with the electrode 14, which is mounted in the tube 24 so that its axis is centrally disposed with respect to the circular part of the cross-section and so that its pointed end is in register with the end of the tube 24. It will be appreciated that it will normally be desirable to provide means for cooling the tube 24, the rod 25 and the electrode 28 in operation; such means are not shown in the drawing, but appropriate arrangements will be readily apparent to those skilled in the art.

The device also comprises means for generating a magnetic field directed across the width of the aperture 27, this means being in the form of a pair of coils 29 and 30 respectively fitting within grooves 31 and 32 of uniform depth which are respectively formed in the tube 24 and the rod 25.

In operation a stream of a suitable gas is passed through the tube 24 so as to issue from the aperture 27, and an arc is struck between the electrode 28 and the nozzle with these parts respectively connected as a cathode and an anode. A current of constant magnitude is passed through the coils 29 and 30 so as to generate a static magnetic field, this resulting in a continuous rotation of the anode root of the arc around the axis of the electrode 28, i.e. along the length of the aperture 27, with the cathode root remaining substantially stationary; the angular velocity of the movement of the arc will of course depend on the magnitudes of the arc current and the current flowing through the coils 29 and 30. If now a conductive workpiece 33 is disposed close to the flattened part of the nozzle in the vicinity of the aperture 27 and is connected in an appropriate manner to the source used to supply the arc current, the arc will be transferred from the nozzle to the workpiece 33 (as indicated diagrammatically at 34 in FIG. 4) during that part of each revolution of the arc corresponding to its traverse of the flattened part of the nozzle. During the remainder of each revolution the arc will revert to the nozzle, but it can be arranged that the fraction of the mean input power which is dissipated while the anode root of the arc is on the nozzle is relatively small, since the arc current in the non-transferred mode can be made much smaller than that in the transferred mode. It will be appreciated that if desired the device could be operated in the non-transferred mode at all times, but this would involve a relatively inefficient use of the input power.

It is envisaged that suitable values for certain of the dimensions of the device illustrated in FIGS. 4 and 5 would be as follows: 0.5 – 4 millimeters for the spacing between the ends of the tube 24 and the rod 25 (i.e. the width of the aperture 27); about 5 millimeters for the wall thickness of the tube 24 (i.e. the depth of the aperture 27); about 4 centimeters for the diameter of the circular part of the external cross-section of the tube 24; about 3 centimeters for the length of the straight part of the external cross-section of the tube 24.

The device illustrated in FIGS. 4 and 5 could be readily modified, without affecting its intended mode of operation, by arranging for the circular part of the wall of the tube 24 to extend up to the end of the rod 25, so that the exit aperture would then be formed only in the flattened part of the nozzle. With such an arrangement the tube 24 and rod 25 could of course form parts of a monolithic copper structure, thus enabling the bracket 26 to be dispensed with.

Besides being useful in applications similar to those for which conventional plasma torches are used, devices such as are described above may also have utility in the following fields: annealing; hot machining; surface preparation prior to coating (relying on an ion bombardment process to clean the surface and provide adhesion); fusion of sprayed coatings (e.g. for reduction of porosity); heat treatment of welds; cosmetic welding; descaling (e.g. of rust and corrosion on ships); scarfing in the steel industry; carburising (using a reducing gas such as methane or another carbonaceous fuel gas); and nitriding (using nitrogen or a partially burnt fuel gas). It is envisaged that for some applications it may be desirable to utilise a device operating in the transferred mode with the opposite polarity to that used in the arrangements described above (i.e. with the internal electrode connected as an anode), in which case for satisfactory operation the device would need to be slightly modified as compared with the devices described above, for example by making the internal electrode of copper instead of tungsten. A particular use for such a reversed polarity device would be to effect bombardment of a workpiece with positive ions, which may be more efficacious than bombardment with negative ions because a higher electric field exists in the cathode region of an arc than in the anode region. A further possibility would be to use two devices operating in the transferred mode as a means of enabling current to be passed through a workpiece such as a steel billet for the purpose of heating it by virtue of its own resistance, one device being as described above and the other being of reversed polarity.

We claim:

1. A heating device comprising: a plasma torch incorporating
   a hollow structure having an inlet and an outlet by means of which a stream of gas may be passed through said structure, said outlet being constituted by a conductive nozzle having an elongated exit aperture whose length is much greater than its width, and
   at least one internal electrode having an active portion disposed within said structure out of contact with said nozzle, said active portion having dimensions small compared with the length of said aperture and being disposed adjacent to said aperture with said aperture being closest to said active portion at a part of said aperture from which said aperture extends longitudinally in both directions; and
   means for generating a magnetic field directed across the width of said aperture and extending along said aperture at least over a portion of said aperture which contains said part of said aperture and which has a length much greater than the width of said aperture.

2. A heating device according to claim 1, in which said active portion of said internal electrode is constituted by one end of a rod, said end being spaced from said aperture by a distance of the same order of magnitude as the width of said aperture.

3. A heating device according to claim 1, in which said means for generating a magnetic field is an electromagnet having poles disposed on either side of said aperture.

4. A heating device according to claim 3, in which said poles are shaped to provide a maximum value of the magnetic flux density in the region of said aperture which is centrally situated between the inside and outside of said nozzle.

5. A heating device according to claim 3, in which the longitudinal axis of said aperture is rectilinear.

6. A heating device according to claim 5, in which the length of said aperture does not exceed five centimeters and said at least one internal electrode is a single internal electrode whose active portion is disposed centrally with respect to said length.

7. A heating device according to claim 6, in which said length is less than 2.5 centimeters.

8. A heating device according to claim 6, in which said active portion of said single internal electrode is constituted by one end of a rod whose axis perpendicularly bisects the length and width of said aperture, said end being spaced from said aperture by a distance of the same order of magnitude as the width of said aperture.

9. A heating device according to claim 1, in which said means for generating a magnetic field consists of two coils respectively disposed on opposite sides of said aperture.

10. A heating device according to claim 1, in which said aperture has a width in the range ½ to 4 millimeters.

* * * * *